Patented Sept. 17, 1929

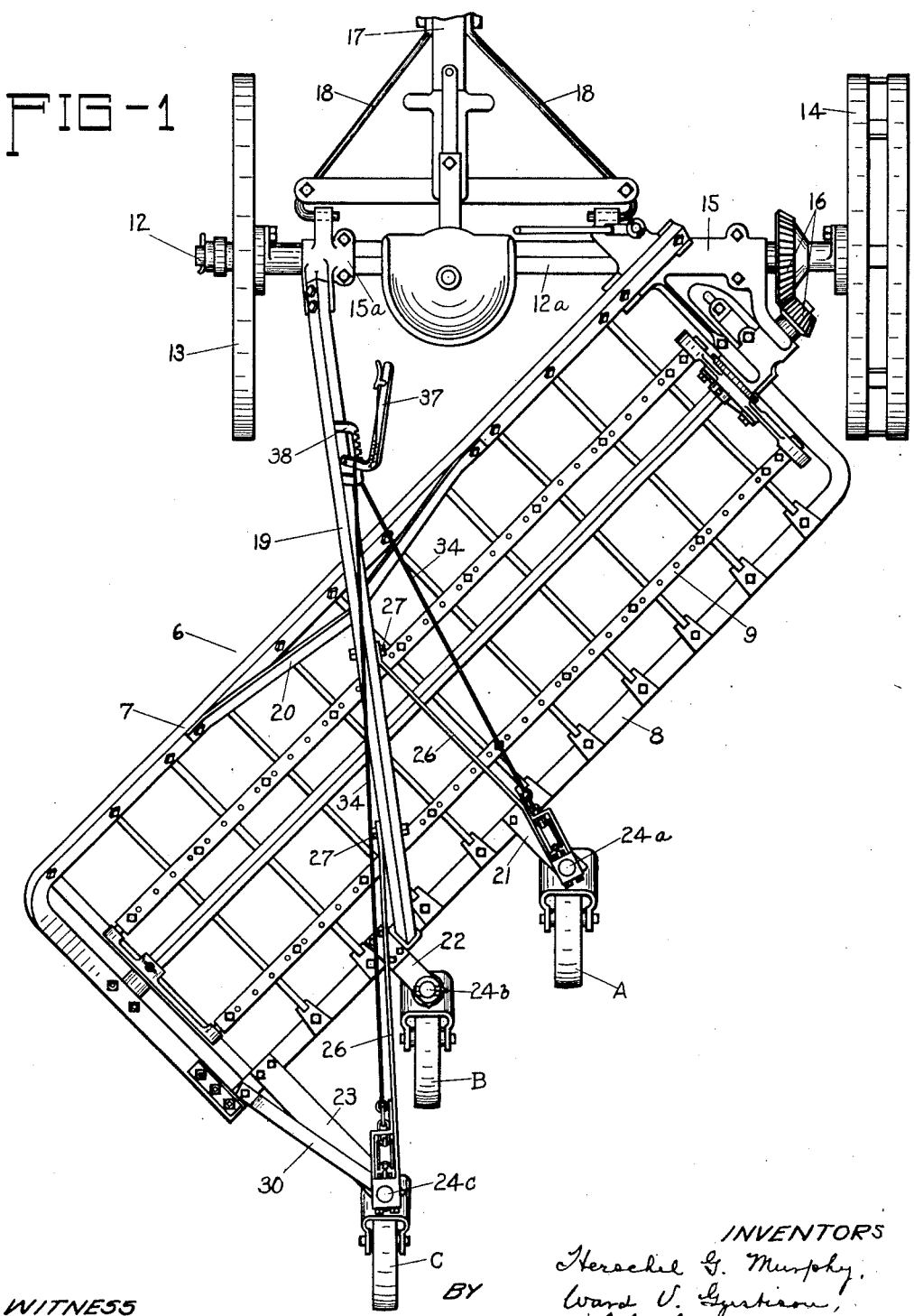

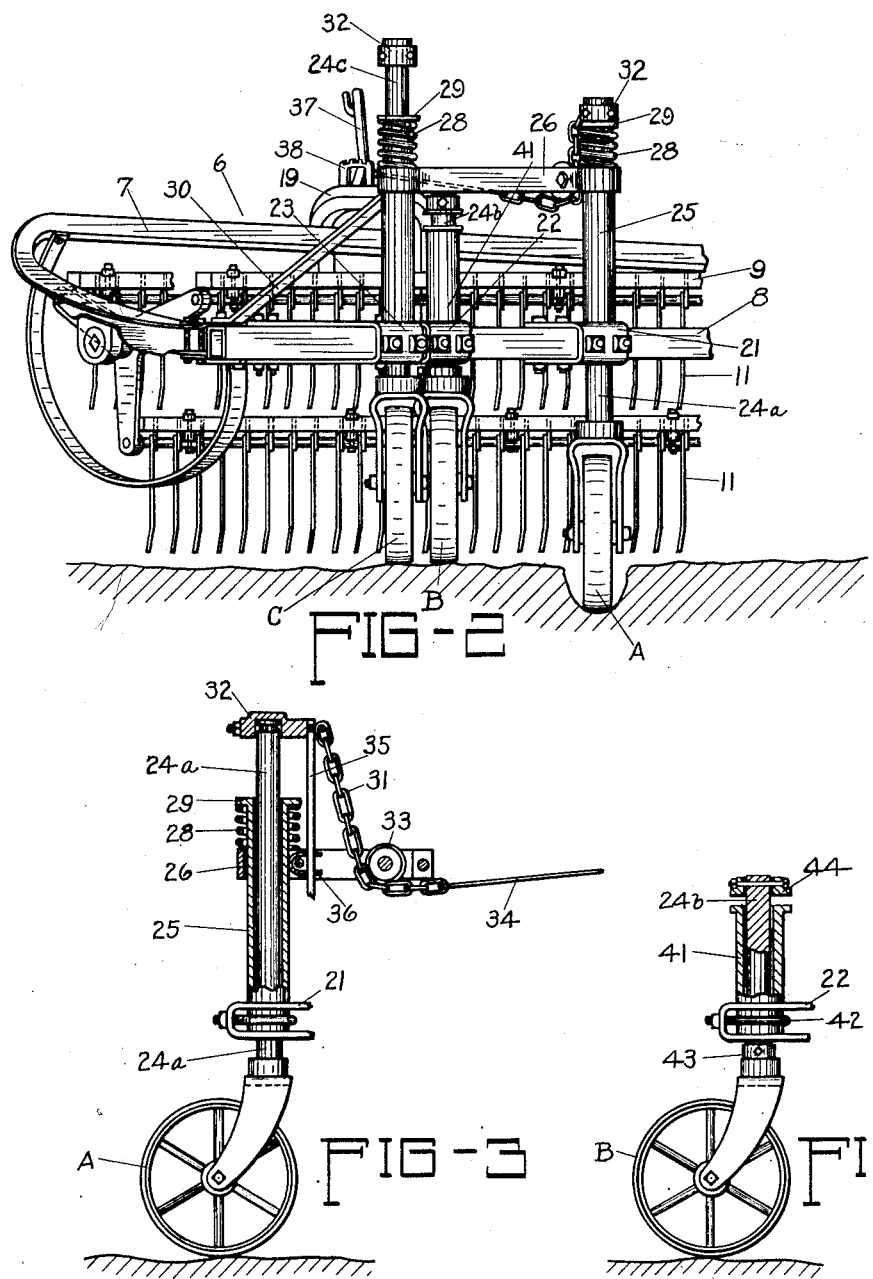

1,728,301

UNITED STATES PATENT OFFICE

HERSCHEL G. MURPHY, OF PORTLAND, OREGON, AND WARD V. GUSTISON, OF WALLA WALLA, WASHINGTON, ASSIGNORS TO DAIN MANUFACTURING COMPANY OF IOWA, OF OTTUMWA, IOWA, A CORPORATION OF IOWA

SIDE-DELIVERY RAKE

Application filed December 24, 1927. Serial No. 242,388.

The present invention relates to hay rakes of the side delivery type, which usually comprise an open frame extending diagonally and rearwardly with respect to the implement, and in which frame the rotary reel is mounted. The front end of this frame is usually supported on a transversely extending front axle, on the ends of which are mounted front wheels, and the rear portion of the frame is usually supported on a castor wheel or wheels which permit the rear end to swing to either side in the steering movement of the implement.

As these implements have been heretofore constructed, pronounced difficulties arise in the operation thereof in fields which are "ditched" for irrigation purposes, i. e., in fields which have a network of small, closely spaced ditches for conveying the water to different parts of the field. When operating these implements in such fields the castor wheels tend to drop into these ditches and to make the steering or guidance of the implement difficult. For example, when the wheels drop into a diagonally extending ditch they tend to track off along the line of the ditch, causing the rear end of the implement to be slewed or deflected sideways. Owing to the considerable leverage which these castor wheels have over the draft pole, it frequently requires considerable effort on the part of the team to swing the implement sideways in order to force the castor wheels up out of the ditch, and in many instances it is even necessary for the operator to lift the wheels bodily up on to level ground. Furthermore, the dropping of the castor wheels into a ditch frequently drops the rear end of the implement down so low that the rake teeth strike the ground. These difficulties are present even in implements equipped with two rear castor wheels.

The principal object of the present invention is to avoid these difficulties by a unique combination and arrangement of rear supporting wheels, which always insure one wheel remaining on level ground. The manner in which this is accomplished will be best understood by reference to the accompanying drawings wherein we have shown a preferred embodiment of our invention, and in which drawings:

Fig. 1 is a plan view of the improved rake.

Fig. 2 is a fragmentary rear elevational view thereof, showing one of the castor wheels in a ditch.

Fig. 3 is a detail sectional view of one of the end castor wheels of the series; and Fig. 4 is a similar sectional view of the intermediate castor wheel.

The general construction of the rake constitutes no part of the present invention, and hence it will suffice to say that it comprises the usual diagonally extending frame 6 constructed of front and rear L-shaped bars 7 and 8, the ends of which are joined together. Rotatably mounted in this frame is the usual reel 9 which supports a plurality of rows of rake teeth 11 (Fig. 2). The front end of the frame is supported on a transversely extending front axle 12, on the outer ends of which the front wheels 13 and 14 are mounted. The frame bars 7 and 8 are usually mounted on the axle through a transverse member 12$^a$ having at its ends bearings 15 and 15$^a$. The reel 9 is driven from one or both front wheels through the usual arrangement of gearing 16. The draft pole 17 has braced connection with the front axle 12 through diagonally extending brace bars 18. The mounting of the frame 6 on the front axle is usually reinforced by an arched bar 19, which is suitably connected at its front end to the bearing member 15$^a$, and is fixedly connected at its rear end to the rear frame bar 8, the intermediate portion of the arched bar being connected with the frame bar 7 as by the strut brace 20. The front wheel 14 is preferably constructed with a relatively wide tread so as to span the width of one of these irrigation ditches to which we have previously referred. If desired, the other front wheel 13 may also be provided with a relatively wide tread.

It is customary to support the rear end of the frame 6 on either one or two castor wheels, which extend diagonally rearwardly from the rear frame bar 8. In the present construction we employ three castor wheels, designated A, B and C, which have a particular grouping or staggered arrangement with respect to each other, whereby one castor wheel will always remain on level ground, as will presently appear. The front castor wheel A is mounted on the rear frame bar 8 through a rearwardly extending bracket 21; the second or intermediate castor wheel B is similarly mounted on the frame bar 8 through a bracket 22, which is somewhat shorter than the bracket 21; and the third or rear castor wheel C is mounted on the frame through a bracket 23 which is considerably longer than either of the brackets 21 or 22.

The front and rear castor wheels A and C have the usual arrangement of adjusting mechanism whereby the rear end of the frame 6 can be raised and lowered by vertical movement between the shanks or standards of such castor wheels and the supporting brackets 21 and 23. Such adjusting mechanism is old and well known, being disclosed in Patent No. 1,313,880 granted to Leon R. Clausen, and accordingly we shall only described the same briefly. The construction shown in Fig. 3 is representative of the adjusting mechanism employed for each castor wheel A and C. The shank 24$^a$ (or 24$^c$) extends up through a sleeve 25 in which the shank can slide and also rotate. Such sleeve is fixedly secured to the frame 6 by the bracket 21 (or 23) and its upper portion is supported by a brace 26, which extends forwardly and is pivotally connected to the arched frame bar 19, as indicated at 27 in Fig. 1. A compression spring 28 which is confined between the upper brace 26 and a shoulder 29 on the upper end of the sleeve 25, serves to cushion the support of the reel frame. The upper portion of sleeve 25 for castor wheel C is braced laterally by a strap 30 that connects with the rear end of frame bar 8. The sleeve 25 is caused to slide up or down along the castor shank 24$^a$, thereby raising or lowering the frame 6, through a chain 31 which is connected to a cap 32 which is swiveled upon the upper end of the shank 24$^a$. Said chain passes under a pulley 33 carried by the brace 26 and connects with a link or rod 34 which extends forwardly to an adjusting lever. The cap 32 carries a guide rod 35 which passes down through guide openings in a bracket 36 secured to the brace 26, whereby the cap is held against rotating with the shank 24$^a$. The two links 34 extend forwardly from each castor wheel A and C to an adjusting lever 37 which operates over a latching quadrant 38 carried by the arched frame bar 19. The rods 34 are usually connected to the lever 37 at points of different radius, so that different degrees of movement will be transmitted to the adjusting mechanisms associated with the castor wheels A and C, thereby compensating for the fact that the rear wheel C raises and lowers the frame through a much longer radius—from the axle 12—than does the front wheel A.

Referring to Fig. 4, the shank 24$^b$ of the intermediate castor wheel B is also mounted in a sleeve 41 in which it can slide and also rotate. This sleeve is rigidly secured to its bracket 22, preferably in the same manner as the sleeve 25, that is to say, by a U-bolt 42 which embraces the sleeve and has its ends secured in the end of the bracket. The shank 24$^b$ has a relatively limited sliding movement in the sleeve 41, the lower end of said sleeve being adapted to engage a collar or shoulder 43 on the shank, and the upper end of such sleeve being adapted to engage a bolt or other suitable stop 44 carried by the upper end of the shank. When the weight of the rear end of the implement is being borne by the intermediate castor wheel B, the sleeve 41 is bearing against the collar 43, and when the reel frame is raised to transport position the sleeve 41 engages the upper stop 44 and lifts the castor wheel B off of the ground. The construction is such that the lower end of the sleeve 41 does not engage the shoulder 43 until the reel frame has dropped down to a point corresponding to its lowest position of adjustment, with the rake teeth just clearing the ground.

Referring now to the manner in which the three castor wheels are grouped, and with particular reference to Fig. 1, it will be seen that the three castor wheels engage with the ground at triangularly spaced points, i. e., lines drawn between the points of contact of the three castor wheels with the ground will define a triangle. This follows from the previously described relation wherein the intermediate castor wheel B is located in closer proximity to the frame bar 8 than is the front castor wheel A, and the rear castor wheel C is located further from this frame bar than either of the castor wheels A or B. Viewing the implement from the side, it will also be seen that the three wheels are each disposed in different transverse planes, that is to say, the three wheels are all located at different distances from a plane through the frame 6 at right angles to the line of travel of the implement. Attention is also directed to the fact that the transverse plane of the intermediate castor wheel B is located closer to the transverse plane of one of the end wheels of the series than to the other. Preferably, the transverse plane of the intermediate wheel B is located in closer proximity to the transverse plane of the wheel A than it is to the corresponding plane of the wheel C.

Viewing the implement from the end, it will also be seen that the fore and aft plane of the intermediate wheel B is in close proximity to the fore and aft plane of one of the other wheels, preferably to the plane of the rear wheel C. The spacing of the two wheels B and C in this fore and aft plane is such that the combined tread widths of the two wheels—the space between the right hand edge of the wheel B and the left hand edge of the wheel C—is greater than the width of the widest ditch which would be encountered in a "ditched" field, such as we have described above. It will be evident that by virtue of the triangular disposal of the three castor wheels, it will be impossible for all three wheels to track in one straight line, irrespective of the positions to which the wheels may swivel.

In considering the efficacy of these three castor wheels for supporting the rear end of the reel frame on level ground, it will first be assumed that the implement is traveling in a direction parallel with the rows of ditches, as illustrated in Fig. 2. If the front castor wheel A should drop into a ditch, as shown in this figure, the other castor wheels B and C remain effective for supporting the frame at its predetermined height. If, on the other hand, the implement should be traveling with the other wheels B and C in the longitudinal plane of the ditch, the combined span of these two wheels would be sufficient to bridge the width of the ditch; or, if one of such latter wheels should drop into the ditch, the other wheel would be traveling along one edge thereof. In either of these conditions, the front wheel A would also be traveling on level ground, so that such wheel would aid in supporting the reel frame at its predetermined height. The transverse spacing between the fore and aft plane of the wheel A and the fore and aft planes of the wheels B and C is proportioned so that it will be less than the spacing between ditches in the typical field.

Assume now that the implement is traveling at right angles to the rows of ditches. Owing to the fact that the three castor wheels are all located in different transverse planes, it will be evident that three points of support remain available for bridging or carrying over such ditches. If the front wheel A drops into a transverse ditch, the other two wheels B and C remain effective for supporting the implement. This applies conversely to each of the other two wheels. Such irrigation ditches are usually spaced substantially uniformly, but such spacing may vary in different fields and in different localities. In this regard, the provision of three castor wheels, and the location of the intermediate wheel in closer proximity to one of the end wheels than to the other is of decided advantage. For example, if only two wheels were employed, the spacing between the transverse planes of these wheels might correspond to the spacing of the ditches, with the result that both wheels would drop simultaneously into adjacent ditches. This is avoided, however, by the provision of the third wheel. Moreover, by spacing the transverse plane of the intermediate wheel unequally with respect to the transverse planes of the end wheels, there is a minimum possibility of all three wheels dropping simultaneously into successive ditches.

Assume now that the implement is traveling diagonally with reference to the rows of ditches, and that these ditches extend approximately parallel with the diagonally extending frame bar 8. This condition represents one of the most adverse situations, and one which causes considerable difficulty with the prior types of implements, even those employing two castor wheels. This will be evident from the fact that these two castor wheels frequently drop into the same ditch, and because they could both swivel and track in the same line they would travel along the ditch and slew the rear end of the implement around correspondingly. Such is prevented in the present construction by virtue of the fact that the points of contact of the three wheels with the ground are not on a straight line, and because these three wheels cannot swivel into alinement so that they will trail one directly back of the other. Thus, if the first two wheels A and B should drop into a ditch, the third wheel C would still remain effective for supporting the implement, because such wheel is offset from the line A—B of the two front wheels. Conversely, if any other pair of the three wheels should drop into a diagonal ditch, or be in position to drop into the same, the implement will nevertheless be supported at its predetermined height owing to the fact that the third wheel, being offset from a line extended between the points of ground contact of the other two wheels, will be traveling on level ground to one side of the ditch. The foregoing will also be true in the case of ditches extending diagonally in the other direction with respect to the travel of the implement, and in the case of ditches at any intermediate angle.

It will be observed that when either wheel A or C drops into a ditch, very little effort is required to force such wheel up out of the ditch, owing to the fact that the implement frame is being supported at another point, and it is only the weight of the wheel itself which must be lifted out of the ditch. Thus the dropping of either of these wheels into a ditch will have practically no effect tending to slew the implement around or otherwise disturbing its guidance during the forward travel of the same. Owing to the limited range of movement of the castor wheel shank $24^b$ in the sleeve 41, the castor wheel B will not drop any appreciable distance into any ditch over which it passes.

What we claim as our invention, and desire to secure by Letters Patent is:

1. In a side delivery rake, the combination of a frame, wheel supporting means for the front end of said frame, and supporting means for the rear end of said frame comprising a plurality of ground engaging devices spaced at different distances from said frame.

2. In a side delivery rake, the combination of a frame having a diagonally extending rear frame bar, wheel supporting means for the front end of said frame, and a plurality of castor wheels supporting the rear portion of said frame and spaced unequal distances from said rear frame bar.

3. In a side delivery rake, the combination of a frame, wheel supporting means for the front end of said frame, and supporting means for the rear portion of said frame comprising three ground engaging devices disposed at different distances from a plane through the frame at right angles to the line of travel of the implement.

4. In a side delivery rake, the combination of a frame, wheel supporting means for the front end of said frame and supporting means for the rear portion of said frame comprising three ground engaging devices disposed at different distances from a plane through the frame parallel to the line of travel of the implement.

5. In a side delivery rake, the combination of a frame, wheel supporting means for the front end of said frame, and means for supporting the rear portion of said frame comprising three ground engaging devices triangularly spaced with reference to each other.

6. In a side delivery rake, the combination of a frame, wheel supporting means for the front end of said frame, and means for supporting the rear portion of said frame comprising three ground engaging devices arranged with the intermediate ground engaging device spaced unequally from the other two devices.

7. In a side delivery rake, the combination of a frame, wheel supporting means for the front end of said frame, and means for supporting the rear portion of said frame comprising three ground engaging devices arranged with the transverse plane of the intermediate ground engaging device in closer proximity to the transverse plane of one of the end wheels than to the other.

8. In a side delivery rake, the combination of a frame, wheel supporting means for the front end of said frame, and means for supporting the rear portion of said frame comprising three ground engaging devices, and arranged with the fore and aft plane of the intermediate ground engaging device in relatively close proximity to the fore and aft plane of one of the other ground engaging devices.

9. In a side delivery rake, the combination of a frame, wheel supporting means for the front end of said frame and supporting means for the rear portion of said frame comprising three castor wheels so arranged that all three of said wheels cannot track in the same line.

10. In a side delivery rake, the combination of a frame, wheel supporting means for the front end of said frame, and supporting means for the rear portion of said frame comprising a front castor wheel, an intermediate castor wheel, and a rear castor wheel having contact with the ground at triangularly spaced points.

11. In a side delivery rake, the combination of a frame, wheel supporting means for the front end of said frame, and supporting means for the rear portion of said frame comprising a front castor wheel, an intermediate castor wheel and a rear castor wheel, said intermediate castor wheel being spaced unequally from said front and rear wheels in the longitudinal and transverse planes of the implement.

12. In a side delivery rake, the combination of a frame, wheel supporting means for the front end of said frame, and supporting means for the rear portion of said frame comprising a front castor wheel, an intermediate castor wheel and a rear castor wheel arranged with the fore and aft plane of said intermediate wheel disposed in closer proximity to the fore and aft plane of the rear wheel than to the corresponding plane of the front wheel.

13. In a side delivery rake, the combination of a frame, wheel supporting means for the front end of said frame, and supporting means for the rear portion of said frame comprising a front castor wheel, an intermediate castor wheel and a rear castor wheel arranged with the transverse plane of the intermediate wheel disposed in closer proximity to the transverse plane of the front wheel than to the corresponding plane of the rear wheel.

14. In a side delivery rake, the combination of a frame, wheel supporting means for the front end of said frame, and supporting means for the rear portion of said frame comprising a front castor wheel, an intermediate castor wheel and a rear castor wheel, said intermediate wheel being disposed in closer proximity to said frame than said front wheel, and said rear wheel being spaced further from said frame than either said front or intermediate wheels.

15. In a side delivery rake, the combination of a diagonally extending frame, a rotary reel carried thereby, a front axle supporting the front portion of said frame, front wheels on said axle, a pair of castor wheels adapted to support the rear portion of said frame, adjusting mechanism for raising and lowering said frame relative to said castor wheels, and a third castor wheel adapted to cooperate with said first named castor wheels for supporting the rear portion of said frame.

16. In a side delivery rake, the combination of a diagonally extending frame, a rotary reel mounted in said frame, an axle on which the front portion of said frame is supported, front wheels on said axle, front and rear castor wheels adapted to support the rear portion of said frame, adjusting mechanism for raising and lowering the frame relative to said castor wheels, and an intermediate castor wheel adapted to cooperate with said front and rear castor wheels in supporting the rear portion of said frame.

17. In a side delivery rake, the combination of a frame, an axle supporting the front portion of said frame, front wheels mounted on said axle, one of said wheels having a relatively wide tread of spanning the width of a ditch in a field, and three castor wheels for supporting the rear portion of said frame and so arranged as to prevent the possibility of all three of such castor wheels dropping simultaneously into a ditch or ditches in the field.

18. The combination with a diagonally arranged side delivery rake frame, of rear supporting means therefor comprising three ground engaging devices in staggered relation to each other to prevent the possibility of all three of such devices dropping simultaneously into an irrigating ditch or ditches in the field.

19. The combination with a diagonally arranged side delivery rake frame, of rear supporting means therefor comprising three castor wheels in staggered relation to each other to prevent the possibility of all three of such wheels dropping simultaneously into an irrigating ditch or ditches in the field.

HERSCHEL G. MURPHY.
WARD V. GUSTISON.